United States Patent [19]

Ishiyama et al.

[11] Patent Number: 4,748,475
[45] Date of Patent: May 31, 1988

[54] COLOR PRINTING SYSTEM

[75] Inventors: Keiichi Ishiyama; Makoto Ueda; Shigemi Misono; Tomoyuki Torii; Kazuto Shikino; Toshiharu Aoyagi, all of Tokyo, Japan

[73] Assignee: Seiko Instruments Inc., Tokyo, Japan

[21] Appl. No.: 59,733

[22] Filed: Jun. 8, 1987

[30] Foreign Application Priority Data

Jun. 10, 1986 [JP] Japan .................... 61-135438

[51] Int. Cl.⁴ .................... G03B 27/32; G03B 27/52
[52] U.S. Cl. .................... 355/27; 355/32
[58] Field of Search .................... 355/27, 32, 35, 77, 355/100; 430/138; 354/297, 301–304, 319

[56] References Cited

U.S. PATENT DOCUMENTS 4,448,516  5/1984  Arney et al. .................... 355/27
4,624,560  11/1986  Beery .................... 355/27
4,648,699  3/1987  Holycross et al. .................... 354/297

Primary Examiner—Richard A. Wintercorn
Attorney, Agent, or Firm—Bruce L. Adams; Van C. Wilks

[57] ABSTRACT

Apparatus is provided for use in color printing systems wherein an image is projected by a plural monochrome pictures corresponding to the pictures separated into three primary colors onto an imaging sheet which contains a dye and a photosensitive composition encapsulated in a layer of pressure rupturable capsules. The imaging sheet projected the image is positioned so the layer of capsules lies between the imaging sheet and an image-receiving sheet. A pressure roller applies pressure against the imaging sheet and the image-receiving sheet to rupture the capsules between them and thereby transfer the dye to the image-receiving sheet.

4 Claims, 5 Drawing Sheets direction of the movement

COLOR PRINTING SYSTEM

BACKGROUND OF THE INVENTION

1. Field of the Invention

This invention relates to a color printing system wherein regions of rupturable capsules of a layer of capsules are ruptured to release dye that prints an color image on an image-receiving sheet, and more particularly the invention is directed to a color printing system which projects the plural monochrome pictures corresponding to the pictures separated into three primary colores onto the imaging sheet, and presses said sheets to transfer the dye from said imaging sheet to said image-receiving sheet.

2. Description of the Prior Art

For the purpose of hard-copying color pictures projected on a display screen of a CAD/CAM system, a thermotransferring printer or an inkjet printer is used. However, there are some problems, it takes long to print out, and only one color can be presented per dot so that the area of one picture element is large, therefore, pictures are roughly printed.

In order to solve the above problems, another approach, shown in U.S. Pat. No. 4,399,209 was proposed. The color imaging system has images formed by imagewise exposing a layer containing a dye and a photosensitive composition encapsulated in a layer of pressure rupturable microcapsules.

The above imaging system attains to present picture elements having the same sizes as those of the microcapsules. Therefore, color pictures can be printed with extremely high resolution.

However, since the imaging system requires surface scanning by use of three kinds of beams having mutually different energy ranges for printing a color picture, the optical system of scanning is complicated and it takes a long time to print one screen.

SUMMARY OF THE INVENTION

An object and advantage of the present invention is to provide a novel color printer which is affordable and does not require expensive and sophisticated machinery for exposure and processing.

Another object of the present invention is to provide a novel color printer which can increase the speed of printing by making it unnecessary to scan energy beams to an imaging sheet which has a layer containing a dye and a photosensitive composition encapsulated in microcapsules.

The above and other related objects and features of the invention will be apparent from a reading of the following description of the disclosure found in the accompanying drawings and the novelty thereof pointed out in the appended claims.

DESCRIPTION OF THE PREFERRED EMBODIMENT

Figure 6:
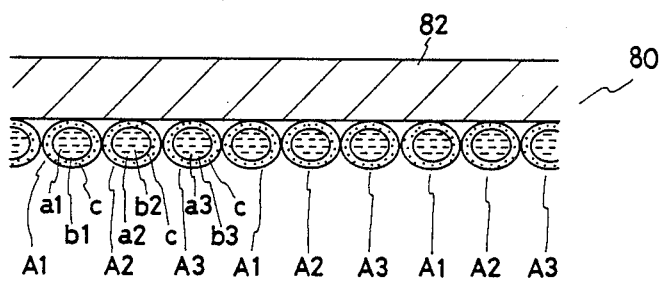
FIG. 6 is a sectional view of the imaging sheet used in the present invention.
Figure 8:
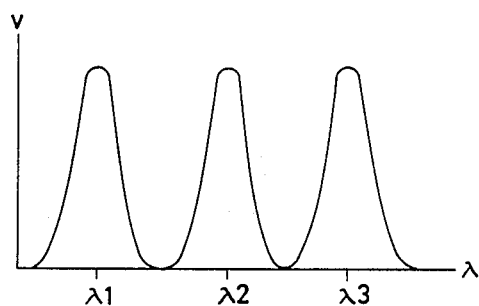
FIG. 8 is an explanatory view showing the sensitive spectral of the imaging sheet.

First, the principle of the present invention is explained:

FIG. 6 shows a simplified structure of the imaging sheet used in this invention. Reference symbols $A_1$, $A_2$, $A_3$ denote microcapsules presenting colors of cyan, magenta and yellow, respectively. Dye materials $a_1$, $a_2$, $a_3$ which generate cyan, magenta and yellow, respectively, and reactive composites $b_1$, $b_2$, $b_3$ which immobilize the dye materials by changing the viscosity etc. as a result of reaction to electromagnetic beams of which wave-lengths $\lambda_1$, $\lambda_2$, $\lambda_3$ correspond to the colors of the dye materials (see FIG. 8), such as light beams, are microcapsulated by surrounding thin films C made of gelatin etc. The microcapsules are coated evenly on the surface of the sheet 82 forming carrier so as to constitute an imaging sheet 80.

Figure 7:
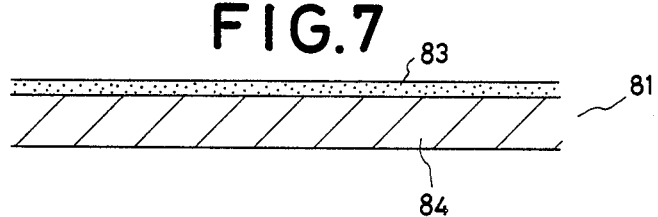
FIG. 7 is a sectional view of the image-receiving sheet used in the present invention.

FIG. 7 denotes an image-receiving sheet 81 to be used with the imaging sheet 80. It is constituted by coating a developing material 83, which generates colors in response to the dye materials $a_1$, $a_2$, $a_3$, on the surface of a sheet 84 forming carrier.

When the above mentioned imaging sheet 80 is exposed to the light having the wave-lengths to which the reactive composites $b_1$, $b_2$, $b_3$ within the microcapsules $A_1$, $A_2$, $A_3$ react, the viscosity of the reactive composites $b_1$, $b_2$, $b_3$ changes. Then, the imaging sheet 80, thus exposed, is united with the image-receiving sheet 81 into one body and pressure is added to the united body so that the capsules $A_1$, $A_2$, $A_3$ are broken. As a result, there comes out a difference in the amount of the dye materials flown out of the capsules between the capsules exposed to light and those unexposed. Consequently, colors corresponding to the wave lengths $\lambda_1$, $\lambda_2$, $\lambda_3$ of the projecting light are presented on the image-receiving sheet 81. That is, color patterns in accordance with the patterns presented at the time of light projection can be obtained.

Figure 1:
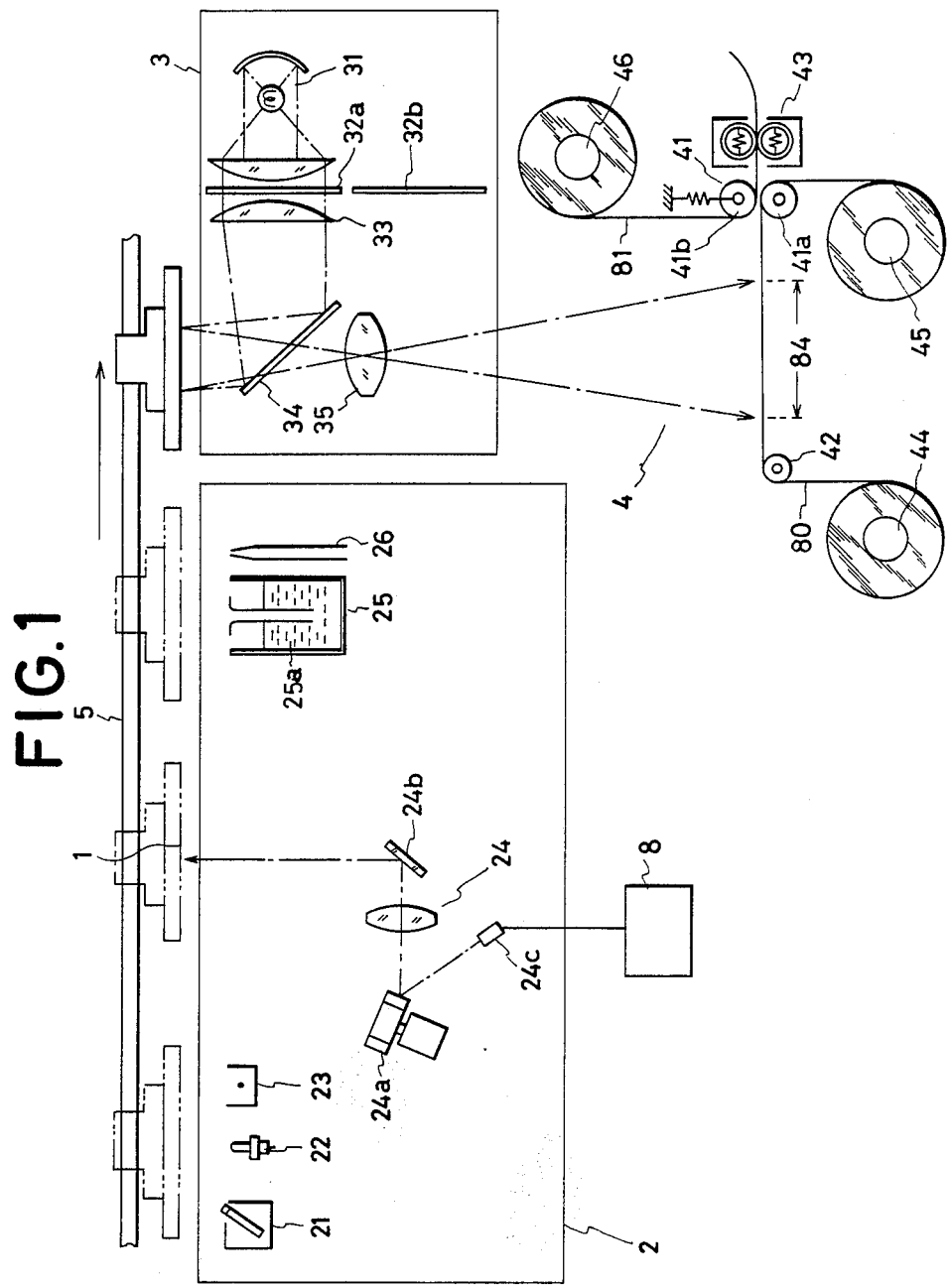
FIG. 1 is a system construction representing one embodiment of the present invention.

FIG. 1 shows one embodiment of the present invention. This system can be divided into four main parts, namely, a light-sensitive plate 1, monochrome picture recording portion 2, projecting portion 3, and a printing portion 4.

Figure 2A:
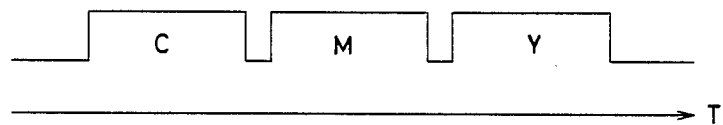
FIG. 2A is a drawing of the wave forms of color resolving signals.
Figure 2B:
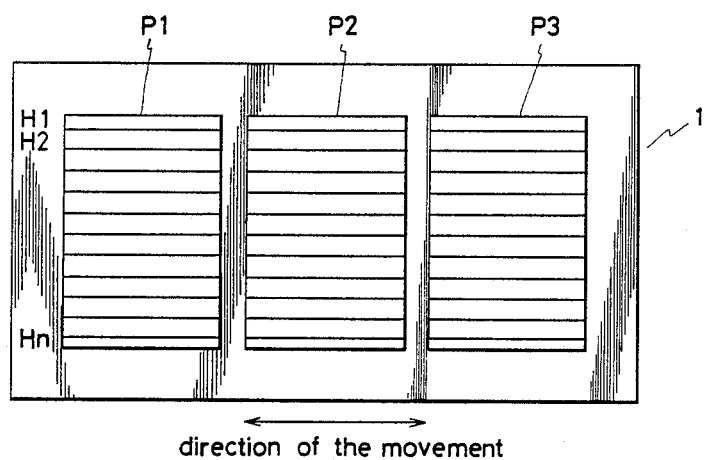
FIG. 2B is a top view of the picture area formed on the light-sensitive plate.
Figure 2C:
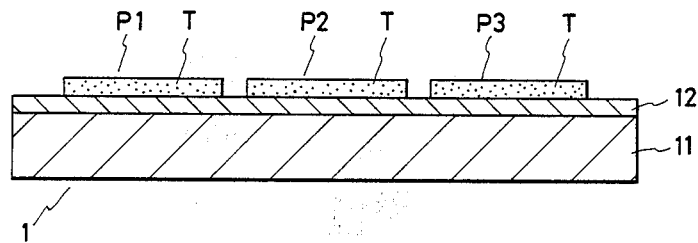
FIG. 2C is a sectional view of the same.

The light-sensitive plate 1, as shown in FIG. 2C, forms a light-sensitive layer 12 made of a material whose electrical resistance changes by projecting light on the surface of a substrate 11, and the plate 1 is so constituted that it reciprocates between the monochrome picture recording portion 2 and the projecting portion 3 along the guide member 5.

The monochrome picture recording portion 2 is so constituted that a cleaning portion 21, electric charge removing lamp 22, electrifier 23, light projecting unit 24, which is mentioned below, developer 25 and an air-jet nozzle 26 are installed facing the picture recording side of the light-sensitive plate 1 along the direction of the forward movement of the light-sensitive plate 1.

The light projecting unit 24 consists of a sub-scanner 24a for scanning light beams in the direction of movement of the light-sensitive plate 1, main scanner 24b for scanning light beams in the direction of the width of the light-sensitive plate 1, and a light modulator 24c for changing the intensity of output light in response to the color resolving signals (FIG. 2A) from a host device 8.

Next, the projecting portion 3 is explained:

Reference symbol 31 denotes a light source which generates light including the wave-lengths $\lambda_1$, $\lambda_2$, $\lambda_3$ to which every microcapsule $A_1$, $A_2$, $A_3$ of the imaging sheet 80 reacts. The light from the light source is focused by the condenser lens 33 through a filter 32a, 32b, or 32c which selectively transmits only the light having the wave-length to which every microcapsule reacts, and then the light is projected onto the half mirror 34. The half mirror 34 reflects the light from the condenser lens 33 toward the light-sensitive plate 1, while it injects the light reflected from the light-sensitive plate 1 onto the projecting lens 35.

The following is the explanation of the printing portion 4:

Between a roller 41a forming the developer 41 together with the other roller 41b and a guide roller 42, the imaging sheet 80 is extendedly placed with the side of the microcapsules facing the projecting lens 35 so that a light-receiving area 84 is provided. On the other hand, the image-receiving sheet 81 is extendedly placed between the developing rollers 41a and 41b with the side of the developing material 83 facing the microcapsules. In order to raise the temperature of the image-receiving sheet 81 a heat roller 43 is provided at the lower side of the sheet run than the developer 41. Reference numerals 44 and 45 denote an imaging sheet supplying reel and a roll-in reel, respectively. Reference numeral 46 denotes an image-receiving sheet supplying reel.

In the above embodiment, the light-sensitive plate 1 is once returned to the home position of the monochrome picture recording portion 2, and then it is moved toward the projecting portion 3. During the movement, the light-sensitive plate 1 is rid of toner and the remaining electric charges, attached to the surface of the plate, by means of the cleaning portion 21 and the electric charge removing lamp 22. Subsequently, the light-sensitive plate 1 is evenly electrified by the electrifier 23. At this step, picture signals are outputted from the host device 8, so that the light modulator 24c is operated by the color resolving signals C of cyan, M of magenta, and Y of yellow, and the scanning devices 24a, 24b are operated by scanning signals. Consequently, the light-sensitive plate 1 receives the light beams corresponding to the color resolving signals in the direction of the movement and forms a latent image of the first line $H_1$ according to the every primary color along the direction of the movement. When the scanning of the first line is completed, the angle of the main scanner 24b is displaced for the amount of degrees according to the width of the one line in order to shift the scanning course of the sub-scanner. Then, the sub-scanner 24a scans the light from the light modulator 24c on the surface of the light-sensitive plate 1 along the second line $H_2$ in the direction of the movement of the light-sensitive plate 1.

Repeating the above steps, the latent images of the primary colors corresponding to the picture signals are formed on the light-sensitive plate 1. When the latent images are completely formed, the light-sensitive plate 1 is transferred on the guide member 5 to the developer 25 and exposed to the developing solution 25a. As a result, the toner particles T in the developing solution are adsorbed in accordance with the latent images so as to form revealed images. Thus, on the surface of the light-sensitive plate 1, as shown in FIG. 2B and FIG. 2C, the first monochrome picture P1, the second P2, and the third P3, corresponding to the color resolving signals, are so formed that they are spaced along the direction of the movement of the light-sensitive plate.

The light-sensitive plate 1, after passing through the developer 25, moves to the projecting portion 3 while evaporating the diffusing medium remained on the surface by the air application from the air jet nozzle 6. Then, the position of the light-sensitive plate 1 is determined so that the first monochrome picture P1 corresponds to the light-receiving area 84. Subsequently, light is projected from the light source 31 through the filter 32a which corresponds to the primary colors of the picture P1. Consequently, the picture P1 receives the spectral light having the wave-length $\lambda_1$ and reflects it at the intensity according to the shade of the picture so as to inject it onto the half mirror 34. The spectral light, after passing through the half mirror 34, focuses an image on the surface of the capsules on the imaging sheet 80 through the projecting lens 35, and hardens only the microcapsule $A_1$ of cyan which reacts to the above projected light, out of the microcapsules $A_1$, $A_2$, $A_3$ on the surface of the picture sheet.

At the time of completing the projection of the first picture P1, the light-sensitive plate 1 is moved so that the second picture P2 can be transferred to the light-receiving area 84. The position of the plate 1 is determined so that the picture P2 is overlapped on the picture previously projected. At this step, the filter 32a is replaced by the filter 32b, and the spectral light having the wave-length $\lambda_2$ to which the microcapsule $A_2$ of magenta, which should be presented by the picture P2 is projected. The second picture P2 is projected onto the imaging sheet 80 so that the picture P2 overlaps the latent image of the picture P1 previously projected. Thus, only the capsule $A_2$ of magenta which the second picture P2 presents is selectively reacted. After the projection of the picture P2, the light-sensitive plate 1 is moved so that the third picture P3 is projected onto the imaging sheet 80 by the spectral light $\lambda_3$. Consequently, the capsule $A_3$ of yellow is reacted. Needless to say, the optical density of every picture P1, P2, P3 formed on the light-sensitive plate 1 corresponds to the intensity of every-color resolving signals. Therefore, the amount of the light reflected from the picture corresponds to intensity of every color resolving signals.

When the latent images of the all pictures P1, P2, P3 are completely formed on the imaging sheet 80 as above, the imaging sheet 80 and the image-receiving sheet 81 are pressed together between the rollers 41a and 41b of the developer 41 so that the two sheets are united.

Since the light-reactive composites $b_1$, $b_2$, $b_3$ enclosed in the microcapsules $A_1$, $A_2$, $A_3$ are hardened at the time of pressing the two sheets according to the amount of the light projected, each amount of dye materials $a_1$, $a_2$, $a_3$ flown out of the capsules $A_1$, $A_2$, $A_3$ according to the amount of the light projected is made varied. Therefore, the dye materials $a_1$, $a_2$, $a_3$ of which each amount corresponds to the amount of the light projected exude onto the image-receiving sheet 81 from the portion of the imaging sheet 80 pressed by the developer 41.

After getting out of the developer 41, the imaging sheet 80 is reeled around the winding reel 45, while the image-receiving sheet 81 is heated by the heat roller 43 so as to accelerate the reaction between the dye materials $a_1$, $a_2$, $a_3$ exuded from the imaging sheet 80 and the developing material 83. As a result, colors corresponding to the picture signals are presented. That is, color patterns corresponding to the picture signals inputted are obtained. As many microcapsules $A_1$, $A_2$, $A_3$ presenting the three primary colors are coated on the surface of the carrier 82, color pictures are represented as accumulation of the tiny three primary colors, where every primary color is melted with one another.

After one picture is printed as above, another picture can be printed by transferring the light-sensitive plate 1 to the monochrome picture recording portion 2 and repeating the above steps.

In case that plural copies are required to be made per picture, the three pictures P1, P2, P3 formed on the light-sensitive plate 1 are projected by turns by means of the spectral light $\lambda_1$, $\lambda_2$, $\lambda_3$ so as to form latent images on the imaging sheet 80. Next, developing by means of the image-receiving sheet 81 is conducted. Thus, the repeating process of making monochrome pictures is omitted. Therefore, the speed of printing can be increased.

In the above stated embodiment, three monochrome pictures corresponding to the three primary colors are formed on the light-sensitive plate 1 at the same time. The same effect can be obviously obtained by projecting a picture onto the picture sheet every time a monochrome picture of every primary color is formed.

Figure 3:
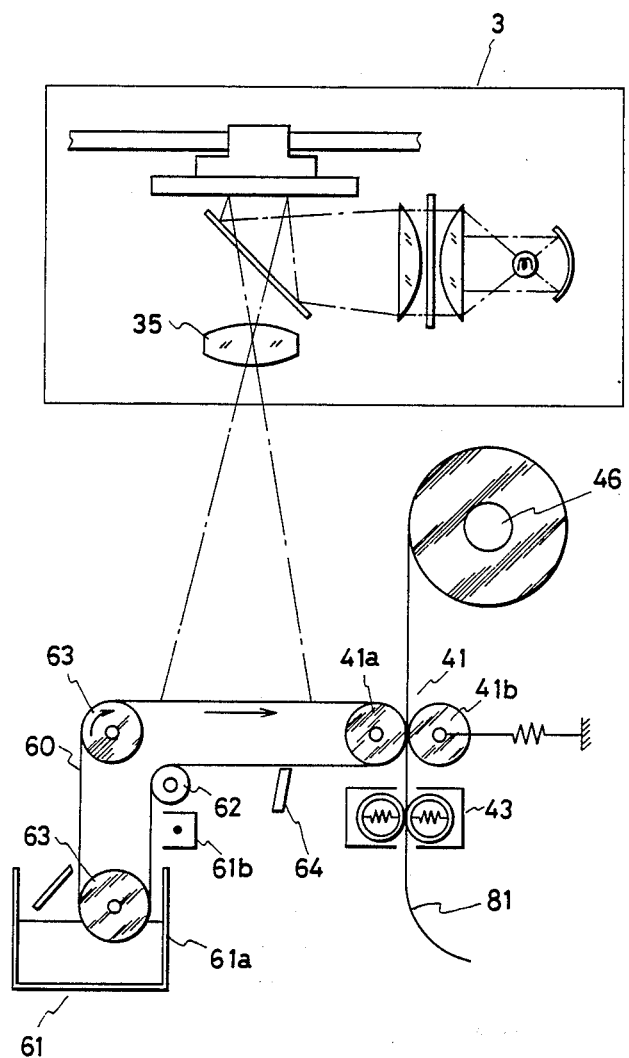
FIG. 3 is a system construction representing another embodiment of the present invention.

FIG. 3 shows the second embodiment of the present invention. Reference numeral 60 denotes a capsule-carrying belt made of an insulative sheet material. It is extendedly provided around a guide roller 62 and driving rollers 63,63 so that it runs between a microcapsule supplying device 61, which is mentioned below, and a developer 41. The side of the belt where microcapsules are attached faces the projecting lens 35. Numeral 61 denotes the above microcapsule supplying device, which diffuses microcapsules $A_1$, $A_2$, $A_3$, in which enclosed are dye materials $a_1$, $a_2$, $a_3$ corresponding to primary colors, and reactive composites $b_1$, $b_2$, $b_3$, into the medium and accomodate the medium in the vessel 61a. In addition, at the upper side of the belt 60 run, there is provided an electrifier 61b. Reference numeral 64 denotes a cleaning unit for removing the bodies of the microcapsules broken by the pressure added during development.

In the second embodiment, the electrifier 61b is operated, with the rollers of the developer 41 being largely spaced so that the drive roller 63 drives the belt 60. As a result, the belt 60 is electrified at a constant potential by receiving electric charges from the electrifier 61b while passing through the diffusing medium. At this step, the microcapsules in the diffusing medium are drawn by the potential of the belt 60 and adsorbed uniformly on the surface of the belt 60.

When the portion where the microcapsules are adsorbed reaches the right-receiving area 84, running of the belt 60 is stopped. Then, pictures P1, P2, P3 on the light-sensitive plate 1 are projected onto the belt with their positions overlapped so as to form latent images on the microcapsules on the surface of the belt.

At the time of completing the forming of the latent images, the rollers 41a, 41b of the developer 41, which are previously spaced, are returned to the specified positions in order to press the belt and the sheet. At the same time, the developer 41 is operated, with the image-receiving sheet 81 facing the side of the belt 60 where capsules are attached. Consequently, the microcapsules on the surface of the belt 60 are broken by the pressure according to the latent images, so that the image-receiving sheet 81 is made colored. The belt 60, after passing through the developer 41, is subjected to the removal of the remaining capsules by the cleaning unit 64. Then, passing the electrifier 61b, the belt 60 is provided with new microcapsules in the vessel 61a and made prepared for the next printing.

The above embodiment permits to reutilize the capsule carrying belt, so that the running cost can be decreased.

Figure 4:
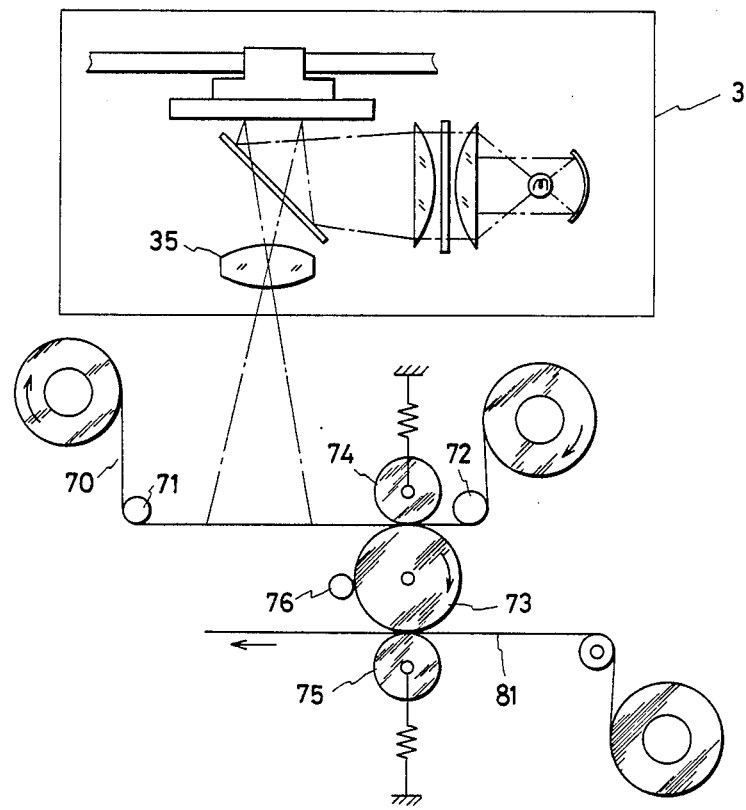
FIG. 4 is a system construction representing the other embodiment of the present invention.
Figure 5:
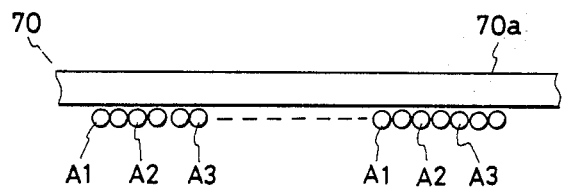
FIG. 5 is a sectional view of the imaging sheet used in the system to one embodiment of FIG. 4.

FIG. 4 shows the third embodiment of the present invention. Numeral 70 denotes a imaging sheet. As shown in FIG. 5, a macro-molecular film 70a having light-transmitting quality, such as polyethylene, is used as a carrier of the sheet. On the surface of the film, microcapsules $A_1$, $A_2$, $A_3$, enclosing dye materials, are coated evenly so as to constitute the imaging sheet. The imaging sheet is extendedly provided between the guide rollers 71 and 72 with the side of the carrier 70a facing the projecting lens. Numeral 73 denotes a copying roller, which is installed on one side of the picture sheet 70 where microcapsules are coated. The copying roller 73 receives the pressure from the pressure roller 74 installed on the opposite side of the picture sheet 70 while it receives the pressure from the developing roller 75 at the lower side of rotation of the roller 73 so as to press the developing sheet. Numeral 76 denotes a cleaning unit for removing the stains from the surface of the copying roller 73.

In the third embodiment, the pictures P1, P2, P3 of the light-sensitive plate 1 are projected onto the opposite side of the picture sheet by means of the light $\lambda_1$, $\lambda_2$, $\lambda_3$, respectively. The images projected are transmitted through the carrier 70a and they act on the microcapsules $A_1$, $A_2$, $A_3$. As a result, the latent images corresponding to the pictures of the primary colors are formed. At the time forming of the latent images is over, the copying roller 73 is rotated. Consequently, the imaging sheet 70 is driven receiving the pressures by the copying roller 73 and the pressure roller 74.

At this step, pressure is applied to the microcapsules $A_1$, $A_2$, $A_3$ on the surface of the picture sheet 70 by the pressure roller 74 through the carrier 70a made of the macro-molecular film. As a result, the capsules are broken so as to discharge the dye materials of the latent images out.

Since the carrier 70a is made of an unporous film, it is definite that the microcapsules cannot be buried in the carrier 70a. Therefore, they are broken without fail.

The dye materials discharged from the capsules in the above manner are attached to the surface of the copying roller 73 and conveyed toward the image-receiving sheet 81. They are copied on the surface of the image-receiving sheet which is pressed by the developing roller 75, so that pictures are presented. The portion which is completely copied is rid of the remaining materials by the cleaning roller 76 and then, returned toward the pressure roller 74.

According to the above embodiment, pressure is added to the microcapsules through one sheet of carrier 70a. Therefore, the depth by which the microcapsules are buried in the carrier is decreased. Accordingly, the pressure to break the capsules can be reduced as much as possible, so that the structure of the developer can be simplified. In addition, the amount of capsule materials attached to the image-receiving sheet is extremely reduced, so that the quality of the printed pictures can be improved.

Though an unporous film is used for the carrier constituting the imaging sheet in the above embodiment, it is obviously possible to decrease the amount of the capsules buried and to lower the pressure to be applied at the time of development as much as possible by employing an ordinary paper which is a fibrous polymer for the imaging sheet of carrier instead.

In the above embodiment, color resolving signals are converted to monochrome pictures by the electrostatic photograph method and then, the imaging sheet is irradiated by reflecting method. Instead of the above, a light-transmitting method can be conducted by employing an electrostatic light-sensitive material made of a transparent substrate.

Besides, a recording medium for forming monochrome pictures is not restricted to an electrostatic light-sensitive material. A liquid crystal panel or the like onto which energy beam can write makes it possible to attain the same effect.

The microcapsules on the imaging sheet are broken by the pressure between the rollers in the above embodiment. Instead, the microcapsules can be broken by elastic oscillation by providing a vibrating block, to which an ultrasound vibrator is attached, so as to press the sheet. The same result can be obtained by projecting microwave or heat ray so as to cause thermal breakdown.

Furthermore, it is explained that the microcapsules and the developing material are coated on different carriers in the above embodiment. It is obvious, however, that the same effect can be brought about by employing an imaging sheet on which the developing material is previously coated. That is, one sheet on which both the microcapsules and the developing material are coated can be used so as to obtain the same result.

As set forth above, this invention attains to form monochrome pictures correspondingly to every-color resolving signals and to project every monochrome picture onto an imaging sheet by means of the light of which wave-length are different from one another.

Accordingly, the following effects are brought about:

(1) The scanning area at the time of converting color resolving signals into pictures is reduced as much as possible, so that the time for writing can be lessened.

(2) The picture information can be written onto an imaging sheet by projecting patterns. Therefore, conforming locations of every primary color information with one another can be simplified and the print size and be changed more easily. In addition, the process of converting color resolving signals into pictures can be omitted at the time of printing plural copies for one picture, so that the speed of color printing can be increased.

What is claimed is:

1. Apparatus for forming an image on an image-receiving sheet, comprising:
   an imaging sheet coating with rupturable dye-containing capsules;
   means for making a plural monochrome pictures on a light-sensitive plate, corresponding to the pictures separated into three primary colors;
   means for projecting said monochrome pictures onto a light-receiving station by lights of which wavelengths are different from one another;
   means for moving said imaging sheet past said light-receiving station; and
   means for pressing said imaging sheet and said image-receiving sheet with said capsules coating face of said imaging sheet facing said image-receiving sheet, so the layer of capsules lies sandwiched between said sheets.

2. The apparatus described in claim 1, wherein:
   said light-sensitive plate comprising a material changed electrical resistance of it by projecting light.

3. Apparatus for forming an image on an image-receiving sheet, comprising:
   an imaging sheet which is connected one-end of it with the other-end of it, so the imaging sheet form a ring;
   a capsule supplying device having dye-containing capsules which are diffused into a liquid medium, and supplying said dye-containing capsules to a surface of said imaging sheet;
   means for making a plural monochrome pictures on a light-sensitive plate, corresponding to the pictures separated into three primary colors;
   means for projecting said monochrome pictures onto a light-receiving station by lights of which wavelengths are different from one another;
   means for moving said imaging sheet past said capsule supplying device and light-receiving station consecutively; and
   means for pressing said imaging sheet and said image-receiving sheet with said capsules coating face of said imaging sheet facing said image-receiving sheet, so the layer of capsules lies sandwiched between said sheets.

4. The apparatus described in claim 3, wherein: said imaging sheet comprising an insulative sheet material.

* * * * *